US011700167B2

United States Patent
Lipkin et al.

(10) Patent No.: US 11,700,167 B2
(45) Date of Patent: *Jul. 11, 2023

(54) SYSTEMS AND METHODS FOR ROUTING DATA IN DISTRIBUTED ENVIRONMENTS

(71) Applicant: Walmart Apollo, LLC, Bentonville, AR (US)

(72) Inventors: Bryan S. Lipkin, Bentonville, AR (US); Biju Nair, Bentonville, AR (US); Saul Solis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/344,616

(22) Filed: Jun. 10, 2021

(65) Prior Publication Data
US 2021/0306207 A1 Sep. 30, 2021

Related U.S. Application Data

(63) Continuation of application No. 16/169,577, filed on Oct. 24, 2018, now Pat. No. 11,038,746.
(Continued)

(51) Int. Cl.
*H04L 12/24* (2006.01)
*H04L 41/0668* (2022.01)
(Continued)

(52) U.S. Cl.
CPC ........ *H04L 41/0668* (2013.01); *G06F 16/245* (2019.01); *G06F 16/27* (2019.01); *H04L 67/10* (2013.01); *H04L 41/5019* (2013.01)

(58) Field of Classification Search
CPC . H04L 41/0668; H04L 67/10; H04L 41/5019; G06F 16/27; G06F 16/245
See application file for complete search history.

(56) References Cited

U.S. PATENT DOCUMENTS 9,106,516 B1 * 8/2015 Palmans .............. G06Q 30/016
11,023,878 B1 * 6/2021 Hernandez ......... G06Q 20/3224
(Continued)

FOREIGN PATENT DOCUMENTS

CN      101364976      2/2009
WO      2012161678     11/2012

OTHER PUBLICATIONS

Retail:Web POS Multi Server Architecture, OpenbravoWiki, http://wiki.openbravo.com/wiki/Retail:Web_POS_Multi_Server_Architecture, Feb. 7, 2017.
Always on POS: Rest Easy if Internet is Lost in Your Store: Continue to Ring Sales and More, Cumulus Retail, https://cumulusretail.com/cumulus-retail/always-cloud-pos/, 2017.
(Continued)

*Primary Examiner* — Fahmida S Chowdhury
(74) *Attorney, Agent, or Firm* — Fitch, Even, Tabin & Flannery LLP (57) ABSTRACT

Described in detail herein are systems and methods for routing data in a distributed environment. A controller can maintain an inactive state. A terminal can receive a request associated with a physical object. The terminal can be communicatively coupled to a cloud computing system. The terminal can attempt to transmit the request to the cloud computing system. A router communicatively coupled to the controller and cloud computing system can attempt to initiate communication between the terminal and the cloud computing system in response to the terminal attempt to transmit the request to the cloud computing system. The router can route the request to the controller in response to failing to initiate communication between the terminal and the cloud computing system after specified amount of time. The controller can switch from an inactive state to an active state in response to receiving the request.

18 Claims, 9 Drawing Sheets

Related U.S. Application Data (60) Provisional application No. 62/576,915, filed on Oct. 25, 2017.

(51) Int. Cl.
  *G06F 16/245* (2019.01)
  *G06F 16/27* (2019.01)
  *H04L 67/10* (2022.01)
  *H04L 41/5019* (2022.01)

(56) References Cited

U.S. PATENT DOCUMENTS

| | | | | |
|---|---|---|---|---|
| 2003/0185151 | A1* | 10/2003 | Kurosawa | H04L 45/00 370/219 |
| 2009/0197637 | A1* | 8/2009 | Song | H04B 1/0064 455/552.1 |
| 2011/0310899 | A1* | 12/2011 | Alkhatib | H04L 45/74 370/392 |
| 2013/0152175 | A1* | 6/2013 | Hromoko | H04W 36/0011 709/206 |
| 2014/0019626 | A1 | 1/2014 | Hubler | |
| 2016/0021138 | A1 | 1/2016 | McGloin | |
| 2017/0041296 | A1 | 2/2017 | Ford | |
| 2017/0331935 | A1* | 11/2017 | Bettesworth | H04M 1/663 |
| 2020/0394646 | A1* | 12/2020 | Beye | G06Q 20/3224 |
| 2020/0402065 | A1* | 12/2020 | Kapur | G06Q 20/3278 |

OTHER PUBLICATIONS

Online/Offline POS: Stay connencted to the store & process transactions from anywhere, anytime, iVend Retail, https://ivend.com/onlineoffline-pos/, 2017.

Retial Store Scale Unit overview, Microsoft Docs, https://docs.microsoft.com/en-us/dynamics365/unified-operations/retail/dev-itpro/retail-store-system-begin, last viewed Oct. 16, 2017.

New Generation Omni-Channel Retail Solutions, Octopus Retail Solution, https://octopuspos.com/site/index, last viewed Oct. 16, 2017.

Focus on Running Your Food Outlet, POSist | Restaurant POS Software, Billing Software, Management System, https://www.posist.com/, last viewed Oct. 16, 2017.

Benefits of a Cloud-Based Point-of-Sale Solution, Optimus Information Inc, http://www.optimusinfo.com/benefits-of-a-cloud-based-point-of-sale-solution/, last viewed Oct. 16, 2017.

International Search Report and Written Opinion from related International Patent Application No. PCT/US18/57253 dated Jan. 2, 2019.

U.S. Appl. No. 16/169,577; Non-Final Office Action dated Sep. 17, 2020.

U.S. Appl. No. 16/169,577; Notice of Allowance dated Feb. 12, 2021.

UKIPO; App. No. 2007605.5; Examination Report dated Jan. 31, 2022; (5 pages).

\* cited by examiner

SYSTEMS AND METHODS FOR ROUTING DATA IN DISTRIBUTED ENVIRONMENTS

CROSS-REFERENCE TO RELATED PATENT APPLICATION

This application is a continuation application of U.S. application Ser. No. 16/169,577, filed Oct. 24, 2018, which claims the benefit of U.S. Provisional Application No. 62/576,915, filed on Oct. 25, 2017, and the disclosures of which are incorporated by reference herein in their entirety.

BACKGROUND

Unresponsive and/or offline systems can cause delays and errors in a distributed system.

BRIEF DESCRIPTION OF DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain the inventive aspects of the present disclosure. In the figures.

DETAILED DESCRIPTION

Described in detail herein are systems and methods for routing data in a distributed environment. A terminal can receive a request associated with a physical object. The terminal can be communicatively coupled to a cloud computing system. The terminal can attempt to transmit the request to the cloud computing system. A router communicatively coupled to a controller and cloud computing system can attempt to initiate communication between the terminal and the cloud computing system in response to the attempt by the terminal to transmit the request to the cloud computing system. The router can route the request to the controller in response to failing to initiate communication between the terminal and the cloud computing system after specified amount of time. The controller can switch from an inactive state to an active state in response to receiving the rerouted request.

In another embodiment, a terminal can receive a request associated with one or more physical objects. The terminal can attempt to transmit the request to the cloud computing system, via a router. The router can route the request to the cloud computing system. The cloud computing system can process the request based on the type of request and the retrieved information associated with the one or more items. The cloud computing system can generate resultant data while processing the request. The resultant data can be committed in a central database. The cloud computing system can be agonistic to the type of hardware used by the terminal and can process requests from different terminal types or configurations.

In one embodiment, the controller is configured to query a local database to retrieve information associated with the physical object. The controller can be configured to store the information associated with the physical object in a temporary container for a specified amount of time. The router can be configured re-attempt communication between the terminal and the cloud computing system after a specified time interval, and after routing the request to the controller. The controller can be triggered to execute an action associated with the physical object in response to receiving the request, generate resultant data based on the action and store the resultant data in a queue. The router can be configured to initiate communication between the terminal and the cloud computing system in response to re-attempting communication between the terminal the cloud computing system. In response to initiating communication between the terminal and the cloud computing system, the router can transmit an alert to the controller. The controller can be configured to matriculate the resultant data from the queue to the central database, via the cloud computing system upon the router establishing communication with the cloud computing system. The terminal is disposed at a different geographical location than the cloud computing system.

Figure 1:
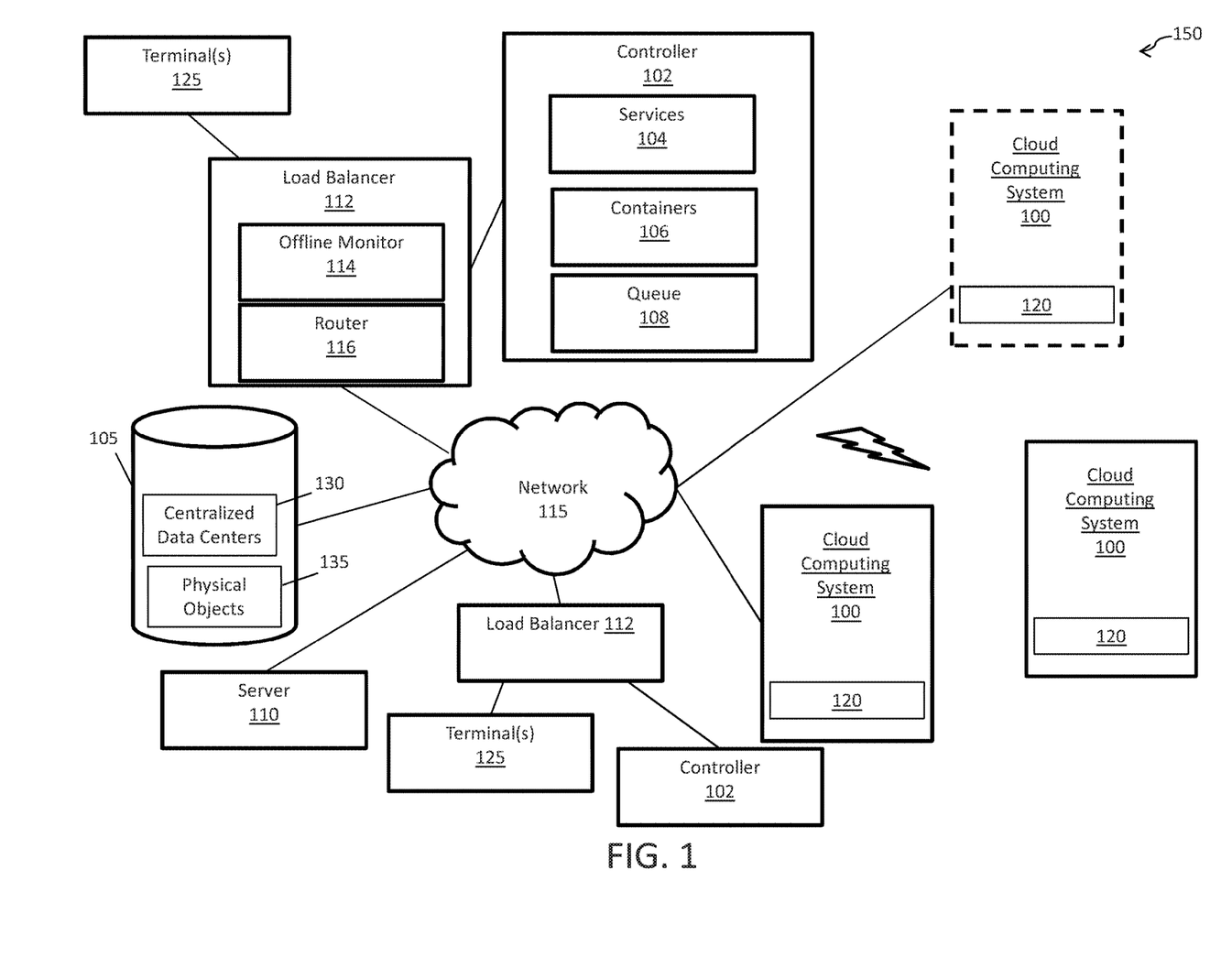
FIG. 1 illustrates a network diagram of a system for routing data in a distributed environment in accordance with an exemplary embodiment.

FIG. 1 illustrates a network diagram of a system 150 for routing data in a distributed environment in accordance with an exemplary embodiment. The system 150 can include one or more cloud computing systems 100, one or more controllers 102, one or more databases 105 one or more load balancers 112, and one or more terminals 125 communicating over communication network 115. The controller 102 can include a services engine 104, containers 106, and a queue 108. The services engine 104 can be an executable residing on the controller 102 configured to process transactions associated with physical objects. The load balancer 112 can include an offline monitor 114 and a router 116. The cloud computing system 100 can include an orchestration engine 120. The orchestration engine 120 can be an executable application residing on the cloud computing system 100 configured to process transactions associated with physical objects.

In an example embodiment, one or more portions of the communications network 115 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The cloud computing system 100 includes one or more computers or processors configured to communicate with the controllers 102, databases 105, load balancers 112, and terminals 125, via the network 115. The controllers 102 can include data repositories (i.e. containers 106), temporary storage devices and a processor to execute the services 104.

The load balancer 112 can include a multi-layer network switch. The multi-layer network switch can be a network switch configured to connect devices through the network 115 using packet switching. The cloud computing system 100 hosts one or more applications configured to interact with one or more components of the system 150. The databases 105 may store information/data, as described herein. For example, the databases 305 can include centralized data centers 130. The centralized data centers 130 can store information associated with transactions and physical objects. The databases 105 can be located at one or more geographically distributed locations from the cloud computing system 100. Alternatively, the databases 105 can be included within the cloud computing system 100.

In one embodiment, a terminal 125 can receive a request associated with one or more physical object. The request can be related to a transaction associated with one or more physical object. The terminal 125 can attempt to transmit the request to the cloud computing system 100, via the load balancer 112. The load balancer 112 can detect the terminal 125 attempting to transfer the request to the cloud computing system 100. The offline monitor 114 can determine whether the cloud computing system 100 is currently online and available. The offline monitor 114 can determine whether the cloud computing system 100 is online and available, by transmitting a data packet to the cloud computing system 100 and confirming a response from the cloud computing system 100. The offline monitor 114 can retransmit the data packet after a specified time interval if no response is received.

The offline monitor 114 can determine the cloud computing system 100 is offline or unavailable as a result of the load balancer 112 being unable to initiate communication between the terminal 125 and the cloud computing system 100. In response to failing to initiate communication with the cloud computing system 100, the router 116 of the load balancer 112 can reroute the request to the controller 102. As a non-limiting example, the controller 102 and the terminal 125 can be in the same geographic location, while the terminal 125 and the controller 102 can be in different geographic locations.

As a non-limiting example, the system 150 can include a bifurcated network. The cloud computing system 115 and databases 105 can be in a first network. The terminal 125 can controller 102 can be in a second network. The first and second network can be connected using the load balancer 112.

In one embodiment, the controller 102 can be in a standby state before receiving the request, and upon receiving the request from the router 116, the controller 102 can switch to an active state. For example, the controller 102 can include a wakeup-pin in the processor. Prior to receiving the request the controller 102 can be in a standby state, configured to only receive data, via the transceiver and/or receiver. Upon receiving the request the wakeup pin in the processor can be activated to switch the controller from a standby state to an active state. As mentioned above, the request can be related to a transaction associated with a physical object. The request can include user information, physical object information, the type of request, and the geographic location at which the request was generated. The controller 102 can execute the services engine 104 in response to receiving the request. The services engine 102 can determine the type of request. The services engine 102 can query the containers 106 to retrieve information associated with the physical object, using the physical object information from the request. The services engine 102 can process the request based on the type of request and the retrieved information associated with the physical object. The services engine 102 can generate resultant data while processing the request. The resultant data can be stored in the queue 108. The queue 108 can be a temporary data storage device.

The load balancer 112 can initiate communication with the cloud computing system 100. In one embodiment, the offline monitor 114 can repeatedly attempt to determine whether the cloud computing system 100 is online and available. For example, the offline monitor 114 can repeatedly transmit data packets to the cloud computing system 100 to determine whether the cloud computing system 100 is online and available. Once the load balancer 112 can initiate communication with the cloud computing system 100, the load balancer 112 can transmit an alert to the controller 102. The controller 102 can matriculate the resultant data from the queue 108 to the centralized data centers 130, via the cloud computing system 100. The resultant data can be committed at the centralized data centers 130.

In another embodiment, a terminal 125 can receive a request associated with one or more physical object. The terminal 125 can attempt to transmit the request to the cloud computing system 100, via the load balancer 112. The load balancer 112 can detect the terminal 125 attempting to transfer the request to the cloud computing system 100. The offline monitor 114 can confirm the cloud computing system 100 is currently online and available. The router 116 can route the request to the cloud computing system 100 in response to establishing communication with the cloud computing system 100.

The cloud computing system 100 can execute the orchestration engine 120 upon receiving the request. The orchestration engine 120 can determine the type of request. The orchestration engine 120 can query the physical objects database 135 to retrieve information associated with the physical object, using the physical object information from the request. The orchestration engine 120 can process the request based on the type of request and the retrieved information associated with the physical object. The orchestration engine 120 can generate resultant data while processing the request. The resultant data can be committed at the centralized data centers 130.

As a non-limiting example, the system 150 can be implemented in a retail store and/or e-commerce system. The terminal 125 can be a Point of Sale (POS) terminal, mobile device and/or a handheld POS terminal. The POS terminal can be a self-service POS terminal and/or a POS terminal operated by an employee of the retail store. The request can be related to a transaction for an item in the store. For example, a user can attempt to process a transaction at the POS terminal. The transaction can be adding items into a virtual cart, removing items from a virtual cart and/or purchasing items in a virtual cart.

The terminal 125 can attempt to transmit the request to process the transaction associated with one or more items to the cloud computing system 100, via the load balancer 112. The load balancer 112 can detect the terminal 125 attempting to transfer the request to the cloud computing system 100. The offline monitor 114 can determine the cloud computing system 100 is offline or unavailable, and the load balancer 112 can fail to initiate communication between the terminal 125 and the cloud computing system 100. The router 116 can route the request from the terminal 125 to the controller 102. The controller 102 can be a store controller located in the retail store along with the terminal 125.

The controller 102 can receive the request from the router 102. The request can include, customer information, item information, the type of request, and the geographic location (i.e. location of the retail store) at which the request was generated. The services engine 102 can determine the type of request. The services engine 102 can query the containers 106 to retrieve information associated with the items. The information can include the price of the items, inventory information associated with the items, rules associated with the items (i.e. age restrictions), tax on the items based on the geographic location of the retail store. The services engine 102 can process the request based on the type of request and the retrieved information associated with items. The services engine 102 can also process the user information, such as any login account information and payment information. The services engine 102 can also maintain virtual cart information. The services engine 102 can add items in the virtual cart and remove items from the virtual cart. The services engine 102 can generate resultant data while processing the request. The resultant data can be payment information (i.e. payment receipt), inventory information based on the sale of items, and information associated with the completed transaction. The resultant data can be stored in the queue 108. The queue 108 can be a temporary data storage device.

Once the load balancer 112 can initiate communication with the cloud computing system 100, the load balancer 112 can transmit an alert to the controller 102. The controller 102 can matriculate the resultant data from the queue 108 to the centralized data centers 130, via the cloud computing system 100. The resultant data can be committed at the centralized data centers 130.

In another embodiment, a terminal 125 can receive a request associated with one or more items. The terminal 125 can attempt to transmit the request to the cloud computing system 100, via the load balancer 112. The load balancer 112 can detect the terminal 125 attempting to transfer the request to the cloud computing system 100. The offline monitor 114 can confirm the cloud computing system 100 is currently online. The router 116 can route the request to the cloud computing system 100. The orchestration engine 120 can process the request based on the type of request and the retrieved information associated with the one or more items. The orchestration engine 120 can generate resultant data while processing the request. The resultant data can be committed at the centralized data centers 130.

Figure 2A:
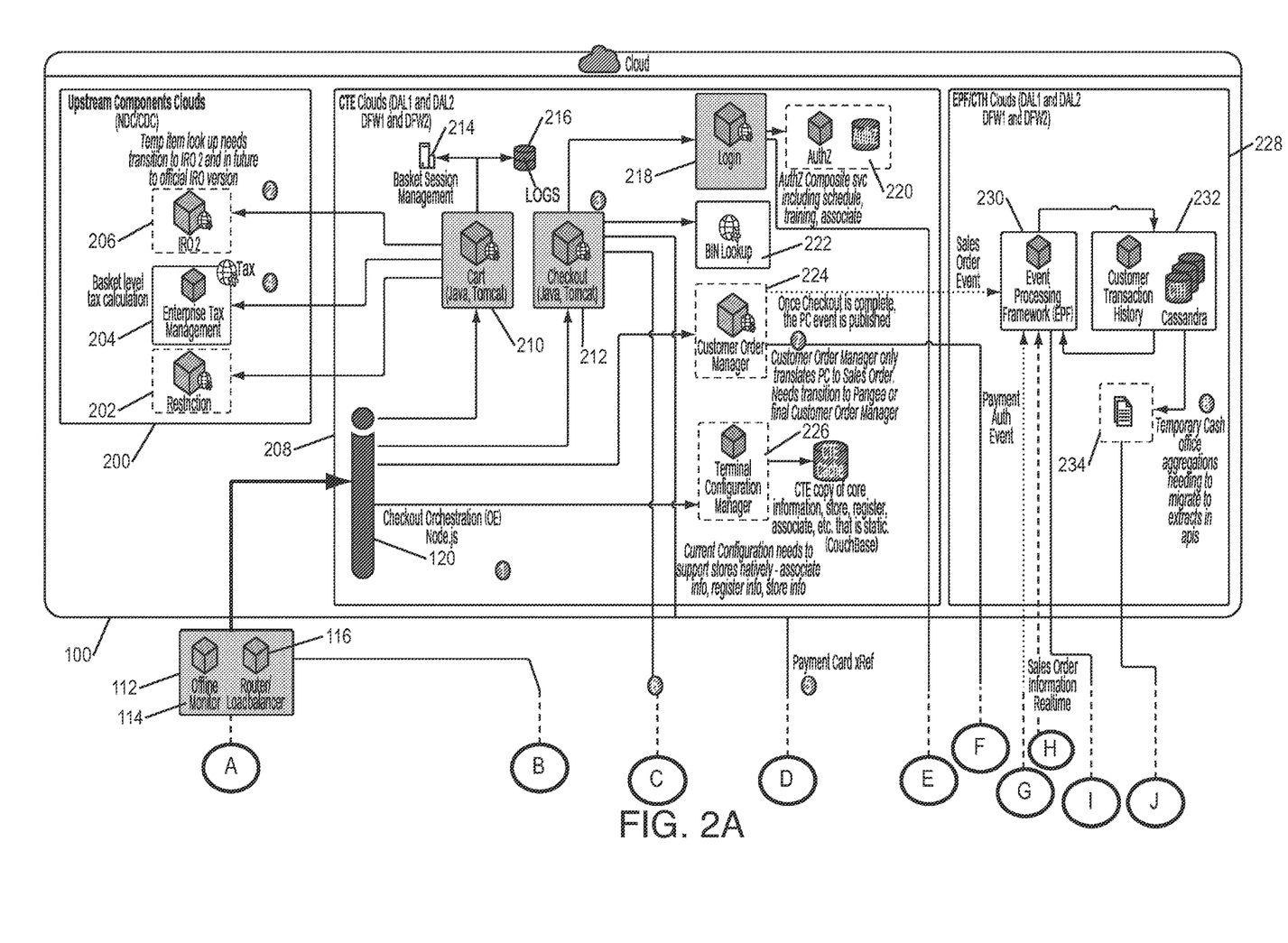
FIGS. 2A-2B is a block diagram of the distributed environment of the system for routing data in accordance with an exemplary embodiment.
Figure 2B:
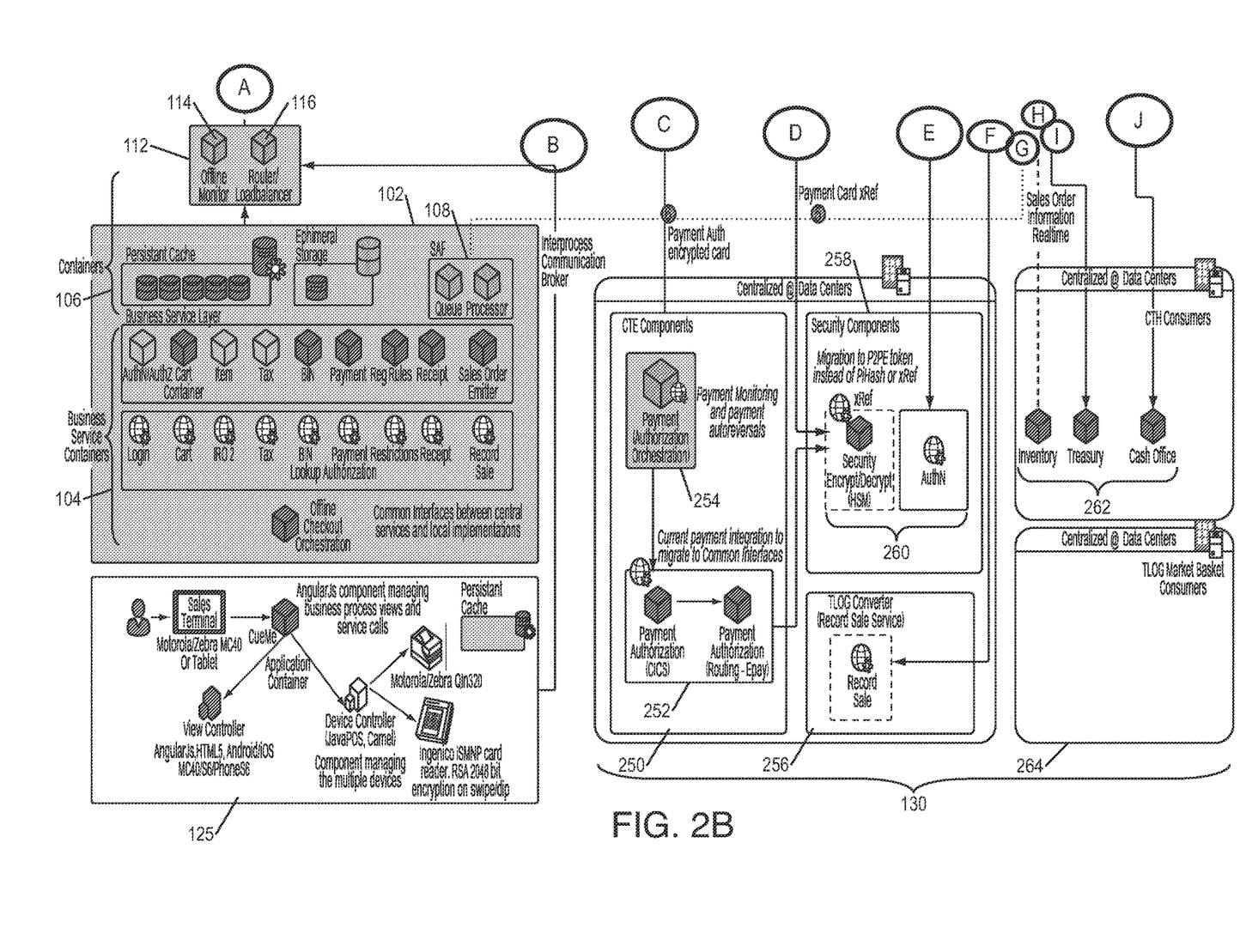

FIGS. 2A-2B is a block diagram of the distributed environment of the system for routing data in accordance with an exemplary embodiment. The cloud computing system 100 can be communicatively coupled to the load balancer 112. The load balancer can include the offline monitor 114 and the router 116. As described herein, the load balancer 112 can be configured to route requests to the cloud computing system 100.

One or more computing devices of the cloud computing system 100 can include upstream components cloud 200. The upstream components cloud 200 can include a restriction service 202, an enterprise tax management service 204 and an Item Read Orchestration (IRO) service 206. The restriction service 202 can be configured to determine whether any physical objects and/or items included in a request are associated with any restrictions. For example, age related restrictions can be applied to alcohol products. The enterprise tax management service 204 can calculate the total tax of the physical objects and/or items in a virtual cart. The IRO service 206 can calculate the price of the physical objects and/or items in the virtual cart.

One or more of the computing devices of the cloud computing system 100 can also include CTE cloud components 208. The CTE cloud components 208 can include the orchestration engine 120, the cart service 210, a checkout service 212, a session management service 214, a logs repository 216, a login service 218, authorization service 220, bin lookup service 222, customer order management service 224, and the terminal configuration manager service 226. The orchestration engine 120 can receive the request associated with the physical objects and/or items. For example, the orchestration engine 120 can call the cart service 210 to manage a virtual cart by maintaining, add and/or removing physical objects and/or items from a virtual cart. The cart service 210 can be coupled to the session management service 214 and the logs repository 216. The session management service 214 and the logs repository 216 can store the physical objects and/or items in a virtual cart for a specified amount of time. For example, the session management service 214 can track the session of a customer shopping in a retail store. As long an instance of the session is active, the virtual cart can be maintained in the logs repository 216. In response to the session being inactive, the sessions management service 214 can instruct the logs repository 216 to delete the physical objects and/or items from the virtual cart stored in the logs repository 216.

The orchestration engine 120 can receive a request to complete and pay for physical objects and/or items at a retail store. The orchestration engine 120 can instruct the checkout service 212 to initiate the checkout process. The request can include the customer's information and the payment information. The checkout service 212 can communicate with the login service 218 to verify the customer's information. The checkout service 212 can communicate with the bin lookup service 222 and the customer order management service 224 to complete the payment of the customer's order. The order can include the physical objects and/or items in the virtual cart. The orchestration engine 120 can communicate with the terminal configuration manager 226 to store the associate, store, and transaction information for each request received by the orchestration engine 120.

One or more computing devices of the cloud computing system 100 can also include an Enterprise Processing Framework (EPF) 228. The EPF 228 can include an EPF service 230, a customer transaction service 232 and a temporary cash office service 234. The EPF service 230 can receive a completed sales order based on a request received from the orchestration engine 120. The EPF service 230 can store the sales order information in the customer transaction history service 232. The customer transaction history service 232 can temporarily store any cash transactions in the temporary cash office service 234. The EPF service 230 can also receive the inventory data as affected by the completed sales order. The EPF service 230 can transmit the payment collected to a treasury data repository. The treasury data repository will be described in further detail with respect to FIG. 2B.

With reference to FIG. 2B, the terminal 125 can be in communication with the load balancer 112. A user can interact with the terminal 125 disposed in a facility. The terminal 125 can transmit a request based on the interaction with user. The load balancer 112 can route the request to the cloud computing system 100. The cloud computing system 100 can process the request and store resultant data generated during the processing of the request in centralized data centers 130.

The centralized data centers 130 can include CTE components 250. The CTE components 250 can include a payment service 254 and a payment authorization service 252. The payment service 254 may receive a request to authorize a payment from the checkout service (checkout service 212 as shown in FIG. 2A). The payment service 254 can monitor the payment requests and transmit the payment authorization request to the payment authorization service 252. The payment authorization service 252 can authorize the payment for a sale.

The centralized data centers 130 can also include security components 258. The security components 258 can include a security encryption and decryption service 260. The security encryption and decryption can use Hardware Security Module (HSM) to decrypt and encrypt payment device information based on a request received from the checkout service (checkout service 212 as shown in FIG. 2A). The security components 258 can also include an authorization service 261. The authorization service 261 can verify customer information based on a request from the login service (login service 218 as shown in FIG. 2A).

The centralized data centers 130 can include a transaction log (TLOG) converter service 256. The TLOG converter service 256 can include a TLOG data repository. The TLOG converter service 256 can receive sales data from the customer order management service 224. The TLOG converter service 256 can store the sales data in the TLOG data repository.

The centralized data centers 130 can include a CTH consumer data repositories 262. The CTH data repositories 262 can include inventory data repository, treasury data repository, and cash office data repository. The CTH data repositories 262 can receive completed sales order data EPF service 230. The CTH data repositories 262 can update inventory data in the inventory data repository based on the completed sales order data, update the treasury data in the treasury data repository based on the completed sales data and update the cash office data in the cash office data repository based on the completed sales data. The centralized data centers 130 can also include a TLOG Market Basket Consumer 262. The TLOG Market Basket Consumer can store TLOG data.

The controller 102 can be in communication with the load balancer 112. As mentioned above, in response to determining the cloud computing system 100 is offline the load balancer 112 can route the request from the terminal 125 to the controller 102. The controller 102 can include services 104 and containers 106. The services 102 can include a login service, a cart service, an IRO service, a bin lookup service, payment authorization service, restriction service, receipt service and a record service. The controller 102 can execute all the services executed by the cloud computing system 100. The controller 102 can also have an offline checkout orchestration engine.

The containers 106 can include cache (temporary buffer) data repositories. The cache repositories can include user data repository, item repository, bin look up repository, and tax data repository. The services 104 can query customer data in the user data repository. The services 104 can query item information from the item repository. The services 104 can query payment information in the bin look up repository. The services 104 can query tax information in the tax data repository. The controller 102 can process the request received from the load balancer 112 using the offline orchestration engine. The offline orchestration engine can use the services 102 and the containers 104 to process the request. The controller 102 can generate resultant data from processing the request.

The containers 106 can also include an ephemeral storage. The ephemeral data repository can store the resultant data in a logs data repository. The resultant data can also be stored in a queue 108. In response to determining the cloud computing system coming online, the resultant data can be transferred from the queue 108 to the EPF service (EPF service 230 as shown in FIG. 2A). The EPF service 230 can matriculate the resultant data to the centralized data centers 130.

Figure 3A:
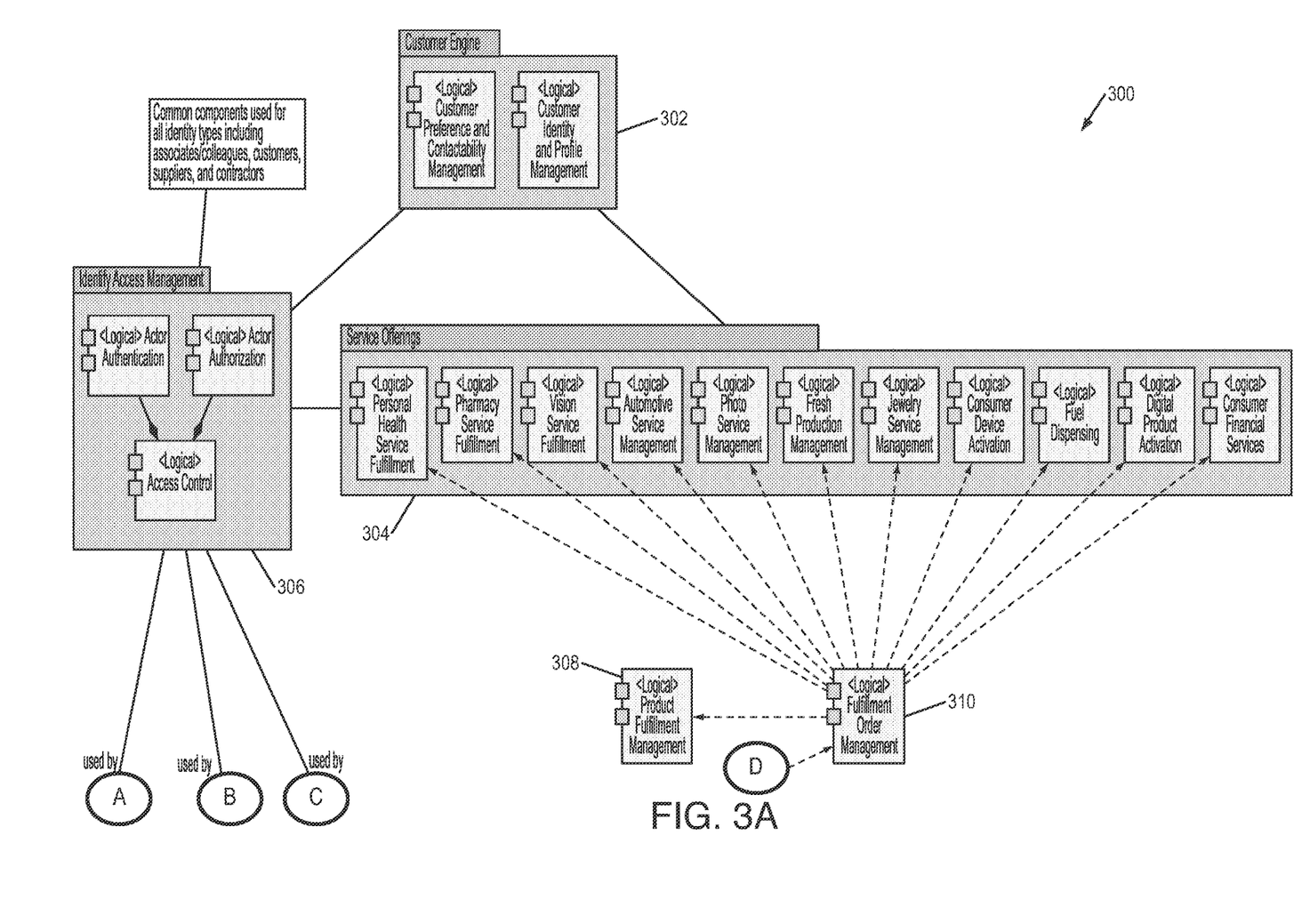
FIG. 3A-B illustrates data flow in the system for routing data in accordance with an exemplary embodiment.
Figure 3B:
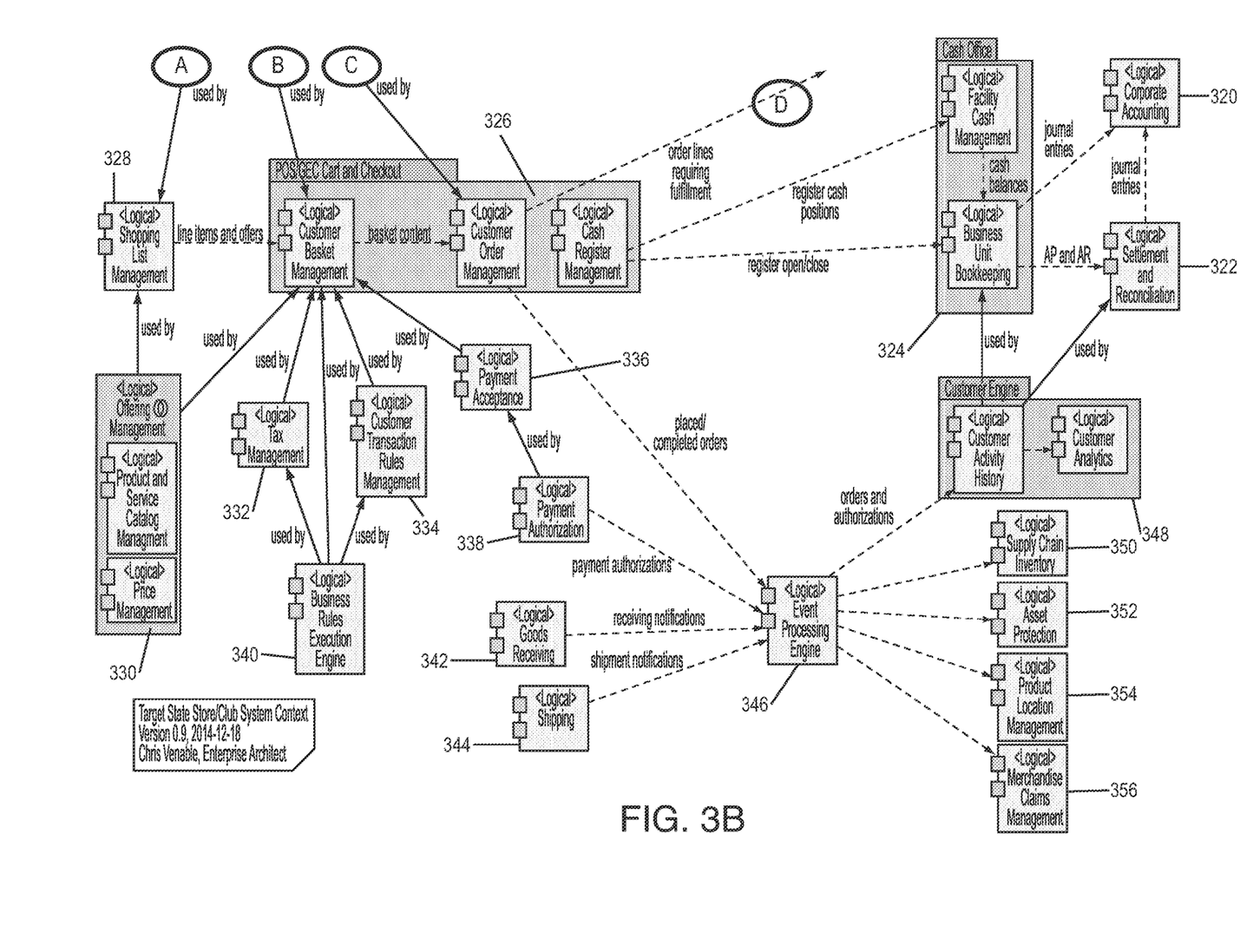

FIG. 3A-B illustrates data flow in the system for routing data in accordance with an exemplary embodiment. As described above, multiple services can reside on the cloud computing system and/or local computing system. The services can transmit access and receive data from one another to process various requests received from a terminal. With reference to FIG. 3A, A customer engine service 302 can include data associated with customer preference and customer identity and profile management. A service offerings engine service 304 can include data associated with personal health services, pharmacy service fulfillment service, vision service fulfillment service, automotive service, photo service, fresh products service, jewelry service, consumer device activation, dispensing, digital product activation, and consumer financial services. The identify access management service 306 can include data associated with actor authentication, actor authorization, and access control.

The service offerings engine 304 can receive data from a fulfillment order management service 310. The service offerings engine 304 can update the data affected by the data received by the fulfillment order management in the appropriate services. The fulfillment order management 310 can also transmit data to product fulfillment management service 308.

With reference to FIG. 3B, the cash office engine service 324 can include data associated with facility cash management and business unit bookkeeping. The cash office engine service 324 can transmit data to corporate accounting service 320 and settlement and reconciliation service 322. Settlement and reconciliation service 322 can transmit data to corporate accounting service 320. The cash office service 320 can receive data from a POS cart and checkout service 326, which stores data associated with customer order management, customer order management and cash register management.

The POS cart and checkout service 326 can use data from the identify access management service (identify access management 306 as shown in FIG. 3A). The POS cart and checkout 326 can receive data from a shopping list management 328 service. The data from shopping list management service 328 can be used by an offering management service 330. The offering management service 330 can include data associated with product and service catalog management and price management.

The POS cart and checkout service 326 can also use the data of offering management service 330, tax management service 332, customer transaction rules management service 334, payment acceptance service 336 and business rules decision engine service 340. The data of payment acceptance service 336 may be used by the payment authorization service 338. The tax management service 332 and customer transaction rules management service 334 can use data from the business rules decision engine service 340.

The POS cart and checkout service 326, payment authorization service 338, goods receiving service 342 and shipping service 344 can transmit data to an event processing engine service 346. The event processing engine service 346 can transmit data to a customer engine service 348, supply chain inventory service 350, asset protection service 352, product location management service 354, and merchandise claims management service 356. The customer engine service 348 can store data associated with customer activity history and customer analytics. The cash office service 324 can use the data of the customer engine service 348.

Figure 4:
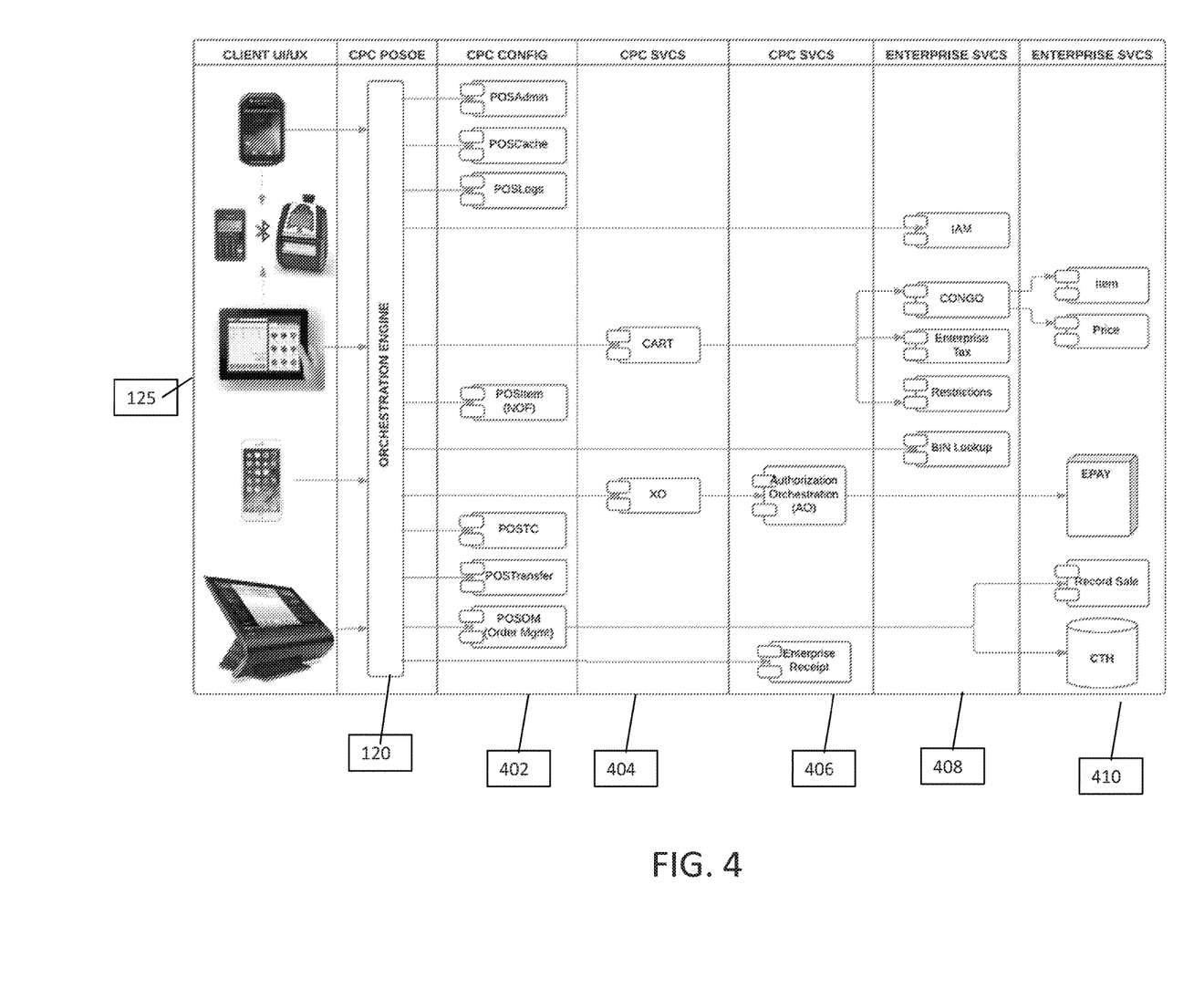
FIG. 4 illustrates a block diagram of an services executed by an orchestration engine in accordance with an exemplary embodiment.

FIG. 4 illustrates a block diagram of an services executed by an orchestration engine in accordance with an exemplary embodiment. As described above, a terminal 125 can transmit a request to a cloud computing system. An orchestration engine 120 can reside on the cloud computing system. The orchestration engine 120 can receive the request from the terminal. The orchestration engine 120 can determine the type of request and execute one or more services to process the request.

For example, the orchestration engine 120 can execute CPC Config services 402. The CPC Config services 402 can include a POSAdmin service, POScache service, POSLogs service, POSitem service, POSTC service, POStransfer service, and an POS Order Management Service. As a non-limiting example, the orchestration engine 120 can receive a request to complete a customer's order of one or more items at a retail store from a POS terminal. The orchestration engine 120 can execute the POS Order Management Service to complete the customer's order and process the request.

The orchestration engine 120 can also execute CPC services 404, 406. The CPC services 402 can include a cart service and an XO service. The CPC services 404 can include an Authorization Orchestration (AO) service and an Enterprise Receipt service. As non-limiting example, the orchestration engine 120 can receive a request to add and/or delete an item in a virtual cart. The orchestration engine 120 can access the cart service to add and/or delete an item from a virtual cart.

The orchestration engine 120 can also execute Enterprise Services 408, 410. The Enterprise Services 408 can include an IAM service, CONGO service, Enterprise Tax service, Restrictions service and a BIN Lookup service. The Enterprise Services 410 can include an item service, a price service, an e-pay service, a record sale service and a CTH data repository. As a non-limiting example, the orchestration engine 120 can the orchestration engine 120 can receive a request to add an item in a virtual cart. The orchestration engine 120 can access the cart service to add an item in the virtual cart. The cart service can execute the CONGO service, Enterprise Tax, and Restrictions service. The CONGO service can execute the item and price service to retrieve the item and the price of the item that was requested to be placed in the virtual cart. The Enterprise Tax service can retrieve tax applicable for the item to be placed in the virtual cart. The Restrictions service can retrieve any restrictions associated with the item to be placed in the virtual cart.

In another non-limiting example, the orchestration engine 120 can receive a request to complete a customer's order of one or more items at a retail store from a POS terminal. The orchestration engine 120 can execute the POS Order Management service to complete the customer's order and process the request. The POS Order Management service can execute the Record Sale service to store the completed sale in the CTH data repository.

Figure 5:
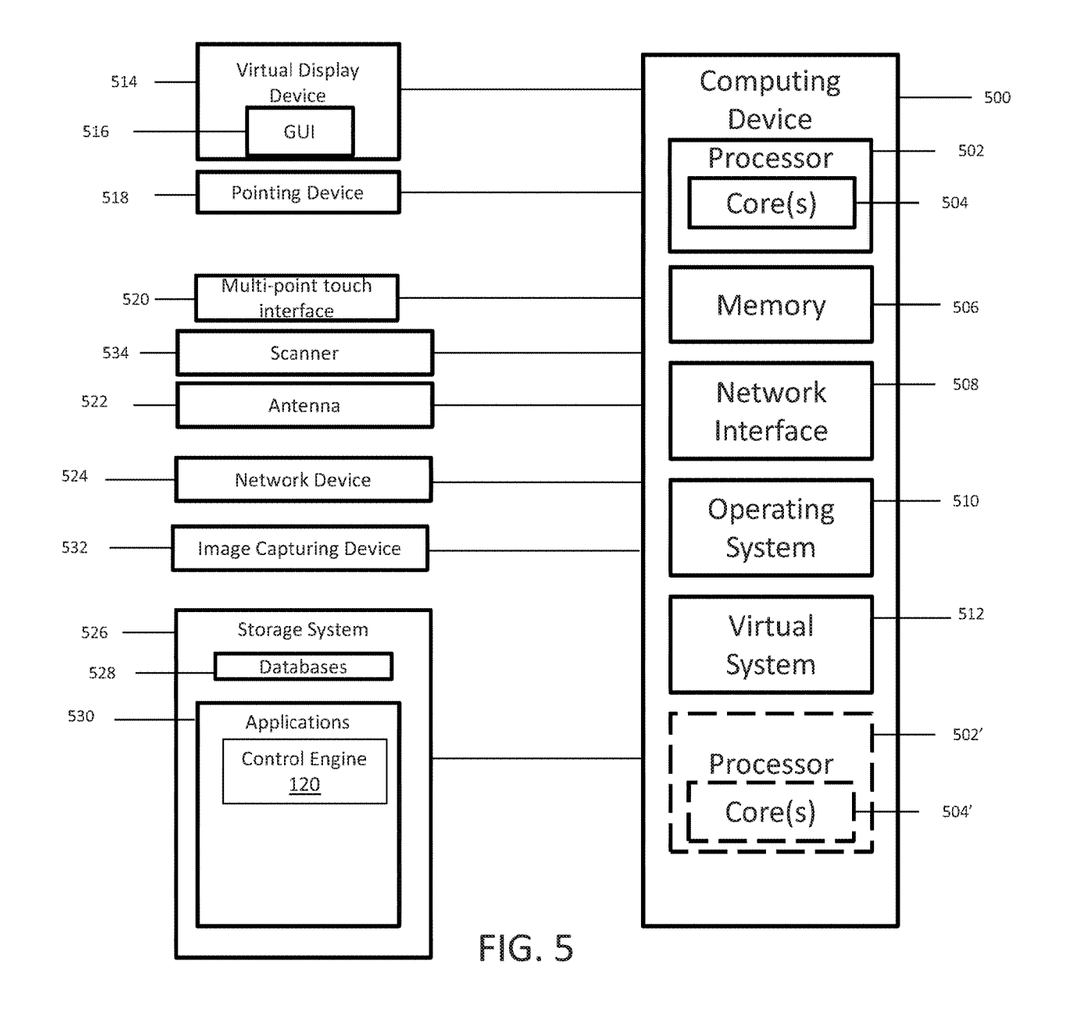
FIG. 5 illustrates a block diagram of an exemplary computing device in accordance with an exemplary embodiment.

FIG. 5 is a block diagram of an exemplary computing device 500 suitable for implementing embodiments of the system for routing data in a distributed environment. The computing device 500 can be embodied as part of the cloud computing system, controller and/or terminal. For example, embodiments of the computing device 500 can be implemented as one of more of the computing device that form the cloud computing system, one or more computing devices that form the terminals, one or more computing device that form the controller, and/or one or more computing devices that form the load balancers. The computing device 500 may be, but is not limited to, a smartphone, laptop, tablet, desktop computer, server or network appliance.

The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 506 included in the computing device 500 may store computer-readable and computer-executable instructions or software (e.g., applications 530 such as the orchestration engine 120) for implementing exemplary operations of the computing device 500. The computing device 500 also includes configurable and/or programmable processor 502 and associated core(s) 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for implementing exemplary embodiments of the present disclosure. Processor 502 and processor(s) 502' may each be a single core processor or multiple core (504 and 504') processor. Either or both of processor 502 and processor(s) 502' may be configured to execute one or more of the instructions described in connection with computing device 500.

Virtualization may be employed in the computing device 500 so that infrastructure and resources in the computing device 500 may be shared dynamically. A virtual machine 512 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof. The computing device 500 can receive data from input/output devices such as, a reader 534 and an image capturing device 532.

A user may interact with the computing device 500 through a visual display device 514, such as a computer monitor, which may display one or more graphical user interfaces 516, multi touch interface 520 and a pointing device 518.

The computing device 500 may also include one or more storage devices 526, such as a hard-drive, CD-ROM, or other computer readable media, for storing data and computer-readable instructions and/or software that implement exemplary embodiments of the present disclosure (e.g., applications 530 such as the orchestration engine 120). For example, exemplary storage device 526 can include one or more databases 528 for storing information regarding the physical objects and users. The databases 528 may be updated manually or automatically at any suitable time to add, delete, and/or update one or more data items in the databases.

The computing device 500 can include a network interface 508 configured to interface via one or more network devices 524 with one or more networks, for example, Local Area Network (LAN), Wide Area Network (WAN) or the Internet through a variety of connections including, but not limited to, standard telephone lines, LAN or WAN links (for example, 802.11, Ti, T3, 56 kb, X.25), broadband connections (for example, ISDN, Frame Relay, ATM), wireless connections, controller area network (CAN), or some combination of any or all of the above. In exemplary embodiments, the computing system can include one or more antennas 522 to facilitate wireless communication (e.g., via the network interface) between the computing device 500 and a network and/or between the computing device 500 and other computing devices. The network interface 508 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

The computing device 500 may run any operating system 510, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 500 and performing the operations described herein. In exemplary embodiments, the operating system 510 may be run in native mode or emulated mode. In an exemplary embodiment, the operating system 510 may be run on one or more cloud machine instances.

Figure 6:
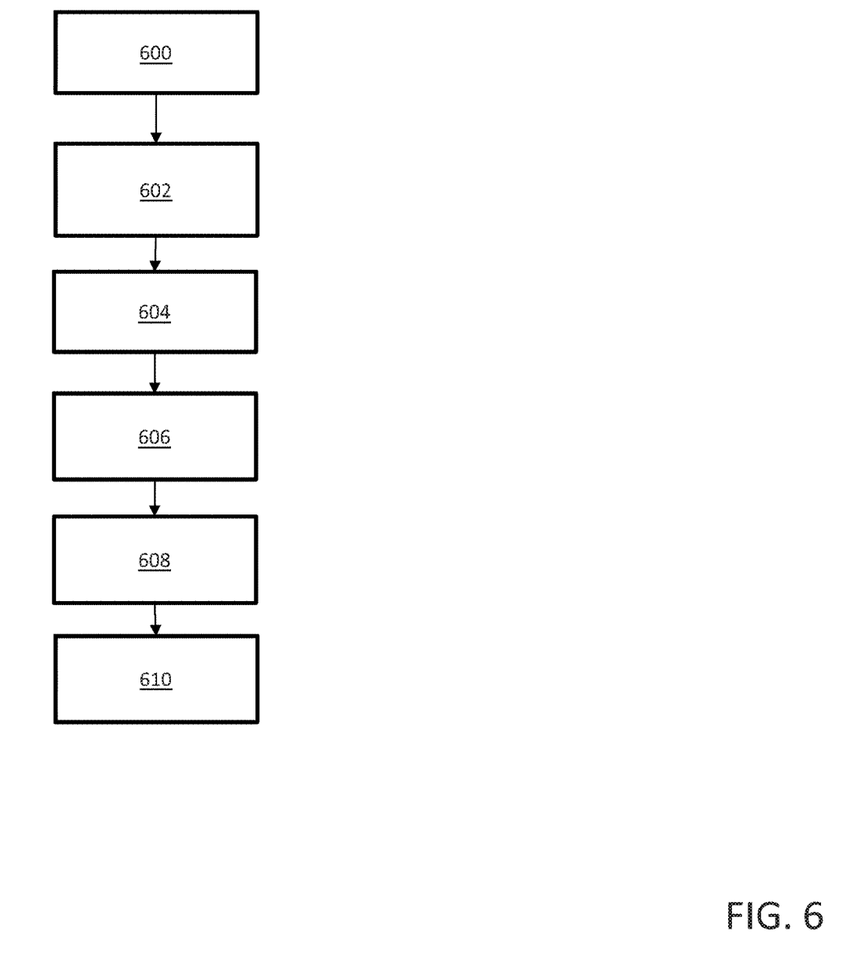
FIG. 6 is a flowchart illustrating a process implemented by a system for routing data in a distributed environment according to an exemplary embodiment.

FIG. 6 is a flowchart illustrating a process implemented by a system for routing data in a distributed environment according to an exemplary embodiment. In operation 600, a controller (e.g. controller 102 as shown in FIGS. 1 and 2B) can maintain an inactive state. In operation 602, a terminal (e.g. terminal 125 as shown in FIGS. 1 and 2B) can receive a request associated with a physical object. The terminal can be communicatively coupled to a cloud computing system (e.g. cloud computing system 100 as shown in FIGS. 1 and 2A). In operation 604, the terminal can attempt to transmit the request to the cloud computing system.

In operation 606, a router (e.g. router 116 as shown in FIGS. 1A and 2B) communicatively coupled to the controller and cloud computing system can attempt to initiate communication between the terminal and the cloud computing system in response to the terminal attempt to transmit the request to the cloud computing system. In operation 608, the router can reroute the request to the controller in response to failing to initiate communication between the terminal and the cloud computing system after specified amount of time. In operation 610, the controller can switch from an inactive state to an active state in response to receiving the request.

Figure 7:
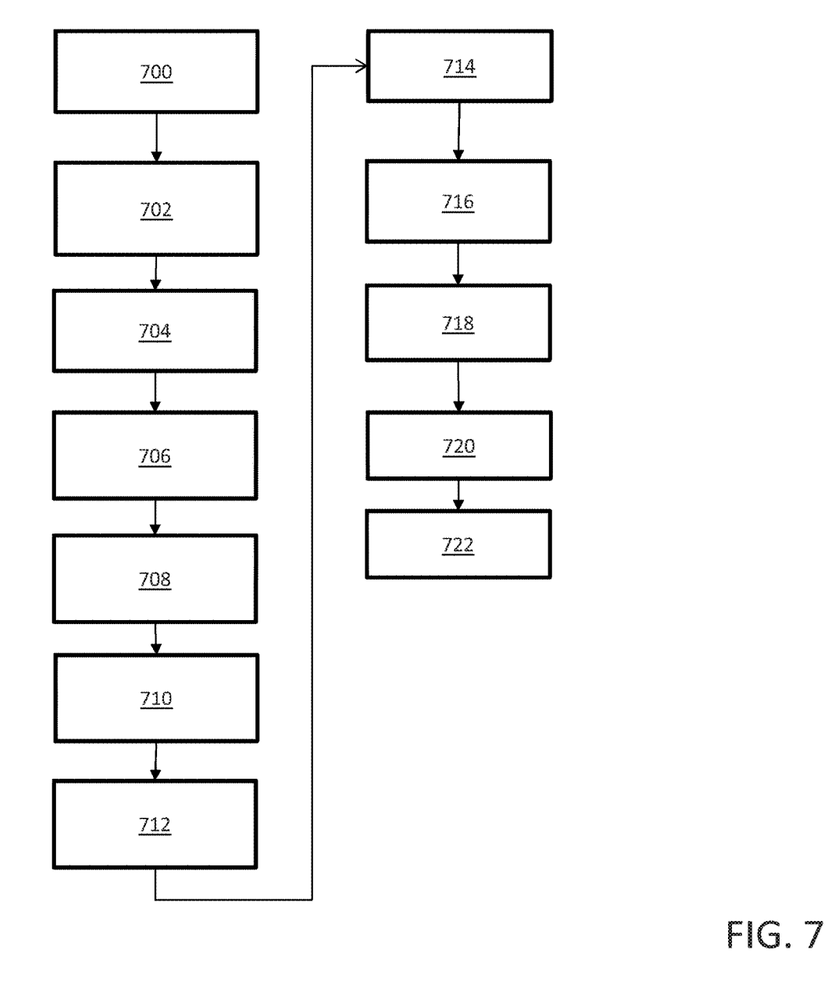
FIG. 7 is a flowchart illustrating a process implemented by a system for routing data in a distributed environment according to an exemplary embodiment.

FIG. 7 is a flowchart illustrating a process implemented by a system for routing data in a distributed environment according to an exemplary embodiment. In operation 700, a controller (e.g. controller 102 as shown in FIGS. 1 and 2B) can maintain an inactive state. In operation 702, a terminal (e.g. terminal 125 as shown in FIGS. 1 and 2B) can receive a request associated with a physical object. The terminal can be communicatively coupled to a cloud computing system (e.g. cloud computing system 100 as shown in FIGS. 1 and 2A). In operation 704, the terminal can attempt to transmit the request to the cloud computing system.

In operation 706, a router (e.g. router 116 as shown in FIGS. 1A and 2B) communicatively coupled to the controller and cloud computing system can attempt to initiate communication between the terminal and the cloud computing system in response to the terminal attempt to transmit the request to the cloud computing system. In operation 708, the router can reroute the request to the controller in response to failing to initiate communication between the terminal and the cloud computing system after specified amount of time. In operation 710, the controller can switch from an inactive state to an active state in response to receiving the request.

In operation 712, the controller can trigger an action associated with the physical object in response to receiving the request. In operation 714 the controller can generate resultant data based on the action. In operation 716, the controller can store the resultant data in a queue (e.g. queue 108 as shown 1 and 2B). In operation 718, the router can initiate communication between the controller and the cloud computing system in response to re-attempting communication with the cloud computing system. In operation 720, the router can transmit an alert to the controller indicating that the router has established communication with the cloud computing system. In operation 622, the controller can matriculate the resultant from the queue to the central database (e.g. centralized data centers 130 as shown in FIGS. 1 and 2B), via the cloud computing system.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for routing requests in a distributed environment, the system comprising:
 a controller including a local database;
 a terminal, the terminal configured to:
  receive a request associated with a physical object;
  attempt to transmit the request to a cloud computing system; and
 a router communicatively interposed between the terminal, the cloud computing system, and the controller, the router is configured to:
  attempt to initiate communication between the terminal and the cloud computing system in response to the attempt by the terminal to transmit the request to the cloud computing system; and
  reroute the request to the controller in response to failing to initiate communication between the terminal and the cloud computing system after specified amount of time.

2. The system of claim 1, further comprising configuring the controller to query the local database to retrieve information associated with the request.

3. The system of claim 2, further comprising configuring the controller to store the information associated with the physical object in a temporary container for a specified amount of time.

4. The system of claim 1, further comprising configuring the router to re-attempt to establish communication with the cloud computing system after a specified time, in response to routing the request to the controller.

5. The system of claim 1, further includes disposing the terminal at a different geographical location than the cloud computing system.

6. The system of claim 1, wherein the cloud computing system is a cloud based system.

7. A system for routing requests in a distributed environment, the system comprising:
a controller including a local database;
a terminal, the terminal configured to:
receive a request associated with a physical object;
attempt to transmit the request to a cloud computing system; and
a router communicatively interposed between the terminal, the cloud computing system, and the controller, the router is configured to:
attempt to initiate communication between the terminal and the cloud computing system in response to the attempt by the terminal to transmit the request to the cloud computing system;
reroute the request to the controller in response to failing to initiate communication between the terminal and the cloud computing system after specified amount of time; and
re-attempt to establish communication with the cloud computing system after a specified time in response to routing the request to the controller;
the controller is configured to:
execute an action associated with the physical object in response to receiving the request;
generate resultant data based on the action; and
store the resultant data in a queue of a temporary container.

8. The system of claim 7, further comprising configuring the router to:
initiate communication between the terminal and the cloud computing system in response to re-attempting communication with the cloud computing system; and
transmit an alert to the controller in response to establishing communication with the cloud computing system.

9. The system of claim 8, further comprising configuring the controller to matriculate the resultant data from the queue to a central database, via the cloud computing system.

10. A method for routing requests in a distributed environment, the method comprising:
receiving, via a terminal, a request associated with a physical object;
attempting, via the terminal, to transmit the request to a cloud computing system including one or more computing devices and a central database;
attempting, via a router interposed between the terminal, the cloud computing system, and a controller including a local database, to initiate communication between the terminal and the cloud computing system in response to the attempt by the terminal to transmit the request to the cloud computing system; and
rerouting the request to the controller in response to failing to initiate communication between the terminal and the cloud computing system after specified amount of time.

11. The method of claim 10, further comprising querying, via the controller, the local database to retrieve information associated with the request.

12. The method of claim 11, further comprising storing, via the controller, the information associated with the physical object in a temporary container for a specified amount of time.

13. The method of claim 10, further comprising in response to routing the request to the controller re-attempting, via the router, to establish communication with the cloud computing system after a specified time.

14. The method of claim 10, further comprises disposing the terminal at a different geographical location than the cloud computing system.

15. The method of claim 10, wherein the cloud computing system is a cloud based system.

16. A method for routing requests in a distributed environment, the method comprising:
querying, via a controller including a local database, the local database to retrieve information associated with a request;
storing, via the controller, the information associated with a physical object in a temporary container for a specified amount of time;
receiving, via a terminal, the request associated with the physical object;
attempting, via the terminal, to transmit the request to a cloud computing system including one or more computing devices and a central database;
attempting, via a router interposed between the terminal, the cloud computing system, and the controller, to initiate communication between the terminal and the cloud computing system in response to the attempt by the terminal to transmit the request to the cloud computing system;
in response to routing the request to the controller re-attempting, via the router, to establish communication with the cloud computing system after a specified time;
rerouting the request to the controller in response to failing to initiate communication between the terminal and the cloud computing system after specified amount of time;
executing, via the controller, an action associated with the physical object in response to receiving the request;
generating, via the controller, resultant data based on the action; and
storing, via the controller, the resultant data in a queue of the temporary container.

17. The method of claim 16, further comprising:
initiating, via the router, communication between the terminal and the cloud computing system in response to re-attempting communication with the cloud computing system; and
transmitting, via the router, an alert to the controller in response to establishing communication with the cloud computing system.

18. The method of claim 17, further comprising matriculating, via the controller, the resultant data from the queue to the central database, via the cloud computing system.

* * * * *